(12) United States Patent
Qi et al.

(10) Patent No.: US 12,122,920 B2
(45) Date of Patent: Oct. 22, 2024

(54) METHOD FOR SYNTHESIZING POLYMER/PIGMENT HYBRID LATEX THROUGH SULFUR-FREE AND SOAP-FREE IN-SITU REVERSIBLE ADDITION-FRAGMENTATION CHAIN TRANSFER (RAFT) EMULSION COPOLYMERIZATION

(71) Applicant: ZHEJIANG SCI-TECH UNIVERSITY, Hangzhou (CN)

(72) Inventors: Dongming Qi, Hangzhou (CN);
Fenping Wang, Hangzhou (CN);
Jiawei Li, Hangzhou (CN); Lei Zhao, Hangzhou (CN); Guiping He, Changzhou (CN)

(73) Assignee: ZHEJIANG SCI-TECH UNIVERSITY, Hangzhou (CN)

(*) Notice: Subject to any disclaimer, the term of this patent is extended or adjusted under 35 U.S.C. 154(b) by 649 days.

(21) Appl. No.: 17/468,718

(22) Filed: Sep. 8, 2021

(65) Prior Publication Data
US 2022/0081568 A1    Mar. 17, 2022

Related U.S. Application Data

(63) Continuation of application No. PCT/CN2021/113581, filed on Aug. 19, 2021.

(30) Foreign Application Priority Data

Sep. 14, 2020 (CN) .......................... 202010960365.4

(51) Int. Cl.
*C08F 293/00* (2006.01)
*B01J 13/18* (2006.01)
(Continued)

(52) U.S. Cl.
CPC .......... *C09B 67/0097* (2013.01); *B01J 13/18* (2013.01); *C08F 2/44* (2013.01); *C08F 293/005* (2013.01);
(Continued)

(58) Field of Classification Search
CPC .. C09B 67/0097; C09B 67/0063; B01J 13/18; C08F 2/44; C08F 293/005; C08F 2438/00; C08F 2438/03
(Continued)

(56) References Cited

U.S. PATENT DOCUMENTS

2009/0258979 A1*  10/2009  Hawkett ............... C08F 220/14
525/212

FOREIGN PATENT DOCUMENTS

| CN | 108589343 A | 9/2018 |
| CN | 110776756 A | 2/2020 |

OTHER PUBLICATIONS

Duc Nguyen, et al., Pigment Encapsulation by Emulsion Polymerization Using Macro-RAFT Copolymers, Langmuir, 2008, pp. 2140-2150, 24.
(Continued)

*Primary Examiner* — Ruiyun Zhang
(74) *Attorney, Agent, or Firm* — Bayramoglu Law Offices LLC (57) ABSTRACT

A method for synthesizing a polymer/pigment hybrid latex through sulfur-free and soap-free in-situ reversible addition-fragmentation chain transfer (RAFT) emulsion copolymerization includes the following: dispersing a pigment with a reactive emulsifier to prepare a pigment dispersion; synthesizing an amphiphilic sulfur-free ω-vinyl-terminated polymethyl methacrylate (PMMA) macromolecular RAFT agent in-situ on a surface of pigment particles through catalytic chain transfer polymerization (CCTP); and adding an acry-
(Continued)

late monomer dropwise, allowing in-situ sulfur-free RAFT polymerization on a surface of pigment particles through the RAFT agent, and adjusting a structure and a composition of an encapsulated polymer layer to obtain a series of uniformly encapsulated and stably dispersed polymer/organic pigment hybrid latexes. The new hybrid latex prepared through sulfur-free and soap-free in-situ RAFT emulsion copolymerization has the characteristics of high dispersion stability, high pigment encapsulation efficiency, clear encapsulated polymer layer sequence, controllable structure, etc., which is suitable for surface encapsulation modification of various pigments.

9 Claims, 3 Drawing Sheets (51) Int. Cl.
$C08F\ 2/44$ (2006.01)
$C09B\ 67/02$ (2006.01)
$C09B\ 67/20$ (2006.01)

(52) U.S. Cl.
CPC ...... $C09B\ 67/0063$ (2013.01); $C08F\ 2438/00$ (2013.01); $C08F\ 2438/03$ (2013.01)

(58) Field of Classification Search
USPC .......................................................... 523/200
See application file for complete search history.

(56) References Cited

OTHER PUBLICATIONS

Nikolaos G. Engelis, et al., Sequence-controlled methacrylic multiblock copolymers via sulfur-free RAFT emulsion polymerization, Nature Chemistry, 2017, pp. 171-178, vol. 9.
GB/T3920-2008, Textiles—Tests for colour fastness—Colour fastness to rubbing, 2009.

* cited by examiner

METHOD FOR SYNTHESIZING POLYMER/PIGMENT HYBRID LATEX THROUGH SULFUR-FREE AND SOAP-FREE IN-SITU REVERSIBLE ADDITION-FRAGMENTATION CHAIN TRANSFER (RAFT) EMULSION COPOLYMERIZATION

CROSS REFERENCE TO THE RELATED APPLICATIONS

This application is a continuation application of International Application No. PCT/CN2021/113581, filed on Aug. 19, 2021, which is based upon and claims priority to Chinese Patent Application No. 202010960365.4, filed on Sep. 14, 2020, the entire contents of which are incorporated herein by reference.

TECHNICAL FIELD

The present disclosure relates to the technical field of encapsulated pigments and coatings in fine chemicals, and in particular to a method for synthesizing a polymer/pigment hybrid latex through sulfur-free and soap-free in-situ reversible addition-fragmentation chain transfer (RAFT) emulsion copolymerization.

BACKGROUND

With the advantages of various types, abundant and bright colors, strong durability, etc., organic pigments are widely used in industrial fields such as ink printing, coatings, plastics, and rubber. In addition, the organic pigments have become indispensable coloring materials for the production of various industrial products. For example, the digital ink-jet printing for textiles and the inkjet printing of organic pigment inks have characteristics such as energy conservation, water conservation, and low pollution, and are new environmentally-friendly coloring technologies.

Pigments are insoluble in water and are dispersed in water in the form of particles during use. The stability of a pigment dispersion system directly affects the service performance of a pigment. When a pigment is dispersed in water by ultrasonic treatment or ball milling, a resulting pigment dispersion appears to be stable, but the pigment will aggregate and deposit after the pigment dispersion stands for a specified period, which cannot achieve long-term stable dispersion. In addition, as there is no affinity between pigments and textiles, film-forming substances such as adhesives generally need to be used to attach pigment particles to a fiber surface, thereby achieving a specified color fastness. Excessive use of adhesives will have some influence on the hand feel, color depth, and air permeability of fabrics, which easily results in unsatisfactory coloring effect, poor hand feel, and other shortcomings for printed fabrics.

At present, it is very common to add a large amount of emulsifier and dispersant for addressing the problem of easy agglomeration of pigment particles. However, in actual conditions, even if a large amount of emulsifier and dispersant is added to an emulsion, sedimentation cannot be avoided for a long time. Moreover, the use of a large amount of emulsifier will affect the film-forming capability of pigments, thereby seriously compromising the quality of pigments.

Surface modification or encapsulation of organic pigment particles is an effective way to solve the easy agglomeration of organic pigment particles, and can also improve the encapsulation efficiency and dispersion stability of a pigment. The multifunctional polymer-encapsulated pigment ink has received extensive attention from researchers because it has low viscosity and excellent jettability and can impart prominent fastness properties to printed textiles.

Chinese Patent Application 201910938295.X discloses a modified sepiolite composite pigment and a preparation method thereof. In the preparation method, chitosan-modified sepiolite is used as a core, and an organic pigment is coated on a surface of the core to form the composite pigment with a core-shell structure. This modified pigment has prominent thermal stability and weather resistance (resistance to acid, alkali, and organic reagents).

Chinese Patent Application 201810261974.3 discloses a preparation method of a pigment/organosilicon/polyacrylate nano-encapsulated coating with a multilayer core-shell structure. The coating provided by the invention can be used in the textile coating printing. After being heated and roasted, the coating can achieve high-efficiency encapsulation of a single textile fiber to form a coating with a specified structural gradient on a fiber surface, thereby leading to printed products with excellent fastness, hand feel, and air permeability.

In the current encapsulation process of organic pigments, an emulsifier is usually added. Emulsifiers are surface active substances that can make two immiscible liquids form a stable dispersion system under specified conditions. Traditional emulsifiers are usually attached to the surfaces of polymer particles through physical adsorption and achieve thermodynamic equilibrium with an environment of the polymer particles, thereby forming a stable polymer latex. However, such emulsifier molecules are prone to desorption, resulting in the loss of stability of the polymer latex. Moreover, traditional emulsifiers tend to migrate in a coating, which affects the physical properties of the coating.

At present, multifunctional polymer-encapsulated pigments also have defects such as low encapsulation efficiency and uncontrollable molecular structure, which have a great impact on the dispersion stability of pigments. Therefore, it is a valuable research direction to synthesize multifunctional polymers with controllable molecular structures and use the multifunctional polymers for encapsulation of pigment particles. An RAFT polymerization is a living free radical polymerization achieved by adding an appropriate chain-transfer agent (RAFT agent) to a traditional free radical polymerization system, where the polymerization proceeds under a reversible chain transfer mechanism. Reversible chain transfer can form dormant macromolecular chains and new initiating reactive species to realize living controllable polymerization of free radicals. In the RAFT polymerization, a chain-growing free radical undergoes a reversible chain transfer reaction with the RAFT agent to convert the original free radical into a dormant species, and at the same time, a chain-growing free radical is released to make a polymer chain have active characteristics. The RAFT technology is achieved under experimental conditions that are very similar to that of traditional free radical polymerizations, and involves monomers, initiators, and polymerization modes that are consistent with that of traditional free radical polymerizations, which is the main advantage of the RAFT technology. Compared with other living free radical polymerizations (such as nitroxide-mediated free radical polymerization and atom transfer radical polymerization), the polymerization has the main advantages of wide application scope, simple polymerization conditions, and convenient and easy operation.

Traditional free radical polymerization mechanism: chain initiation: I→R·

R·+M→RM·

RM·+M→RM2·     chain growth:

RM2·+M→RM3·

. . .

RMn−1·+M→ . . . →RMn·

RMn·→dead polymer     chain termination:

Reaction process of RAFT polymerization:

z = activating group

Nguyen reported a new method of using an amphiphilic random macromolecular RAFT copolymer to combine a hydrophilic inorganic pigment (with zirconia and alumina as representatives) and a hydrophobic organic pigment (with phthalocyanine blue as a representative) with polymethyl methacrylate (PMMA)/butyl acrylate (BA). The method allows the dispersion of the pigment and promotes the uniform growth of the polymer on surfaces of pigment particles, such that the pigment particles are encapsulated by a thick polymer shell and a core-shell structure is formed. This method has the main advantage of high pigment encapsulation efficiency. However, this method uses a traditional sulfur-containing RAFT agent, which will cause environmental pollution [Langmuir 2008, 24, 2140-2150]. A polymer prepared using a traditional sulfur-containing RAFT agent is colored and will produce an awful smell. The inherently-colored polymer is not conducive to pigment coloration, and will make it difficult to control the shade of an organic pigment dispersion. The use of sulfur-containing RAFT agents will lead to some environmental pollutions, which does not meet the requirements of green development. Engelis reported a sulfur-free RAFT free radical emulsion polymerization with sulfur-free ω-vinyl-terminated PMMA as a chain-transfer agent [Nature Chemistry, 2017, 9: 171-178]. It is a new development trend to design and synthesize multifunctional polymers with controllable molecular structures and achieve effective encapsulation for pigment particles by this method.

SUMMARY

The technical problem to be solved by the present disclosure is to provide a method for preparing a polymer/pigment hybrid latex through sulfur-free and soap-free in-situ RAFT emulsion copolymerization, which solves the problem that the shade is difficult to control when a polymer prepared by a traditional sulfur-containing RAFT agent is used to encapsulate organic pigment particles, and more importantly, solves the problem that current multifunctional polymer-encapsulated pigments have low encapsulation efficiency and uncontrollable molecular structure. The present disclosure adopts the sulfur-free and soap-free RAFT free radical emulsion polymerization to synthesize a hybrid latex, which is expected to obtain a sulfur-free and soap-free polymer/pigment hybrid latex and can also improve the encapsulation efficiency and dispersion stability of organic pigments.

The present disclosure provides a method for synthesizing a polymer/pigment hybrid latex through sulfur-free and soap-free in-situ RAFT emulsion copolymerization, including the following steps:

(1) dispersing a pigment with a reactive emulsifier to prepare a pigment dispersion;

(2) adding a methacrylate comonomer, a cobalt complex (as a catalyst), water (as a solvent), and a water-soluble initiator to the pigment dispersion to form a reaction system, and allowing the reaction system to undergo catalytic chain transfer polymerization (CCTP) to obtain a reaction system in which amphiphilic sulfur-free ω-vinyl-terminated PMMA macromolecular RAFT agent of amphiphilic sulfur-free PMMA macromonomers bearing a vinyl group at the ω-terminus is synthesized in-situ on a surface of pigment particles;

(3) adding an acrylate monomer to the reaction system with the RAFT agent obtained in step (2), allowing in-situ sulfur-free RAFT polymerization through the RAFT agent of amphiphilic sulfur-free PMMA macromonomers bearing a vinyl group at the ω-terminus, and adjusting a structure and a composition of an encapsulated polymer layer to obtain a series of polymer/organic pigment hybrid latexes with uniform encapsulation and stable dispersion.

In step (1), the reactive emulsifier used in the preparation of the pigment dispersion may be one or more from the group consisting of sodium hydroxypropane sulfonate (HP-MAS), allyloxy polyoxyethylene (10) nonyl ammonium sulfate (DNS-86), and nonyl phenol polyoxyethylene (4) ether ammonium sulfate (DNS-458); and the reactive emulsifier may be added at an amount 5% to 10% of a mass of the methacrylate comonomer. Compared with a traditional emulsifier, the reactive emulsifier additionally has a reactive functional group. The reactive functional group can participate in the emulsion polymerization and can be covalently bonded to a surface of polymer particles to become a part of the polymer, which avoids desorption of the emulsifier from polymer particles or migration of the emulsifier in a latex film, thereby improving the stability of an emulsion.

In step (1), in the preparation of the pigment dispersion, the reactive emulsifier is first dissolved in water, then the pigment is added, and a resulting mixture is subjected to ultrasonic homogenization to obtain the pigment dispersion; and the pigment may be titanium dioxide, phthalocyanine blue, benzidine yellow, and so on. A variety of pigments are used to prepare a variety of pigment dispersions to verify the wide applicability of the method for synthesizing a polymer/pigment hybrid latex through sulfur-free and soap-free in-situ RAFT emulsion copolymerization.

In step (2), the cobalt complex may be bis[(difluoroboryl) dimethylglyoximato] cobalt(II) (CoBF); and the cobalt complex may be added at an amount 80 ppm to 120 ppm of the mass of the methacrylate comonomer.

The methacrylate comonomer used in step (2) may be one or more from the group consisting of methyl methacrylate (MMA) and n-butyl methacrylate (n-BMA).

In step (2), the water-soluble initiator may be one or two from the group consisting of azodicyanovaleric acid (ACVA), potassium persulfate (KPS), and ammonium persulfate (APS); and the initiator may be added at an amount 1% to 5% of the mass of the methacrylate comonomer.

In step (2), the cobalt complex may be dissolved in the methacrylate comonomer, and then a resulting mixture may be added to the reaction system by injection.

In step (2), when the CCTP method is used to synthesize the RAFT agent of amphiphilic sulfur-free PMMA macromonomers bearing a vinyl group at the ω-terminus in-situ on the surface of pigment particles, different emulsifiers and different methacrylate comonomers can be added to obtain RAFT agents of amphiphilic sulfur-free PMMA macromonomers bearing a vinyl group at the ω-terminus with different structures.

In step (2), when the RAFT agent of amphiphilic sulfur-free PMMA macromonomers bearing a vinyl group at the ω-terminus is synthesized in-situ, the methacrylate comonomer undergoing oxygen-exhausting treatment may be injected into a reactor, and the feed rate is 0.6 mL/min.

In step (2), the RAFT agent of amphiphilic sulfur-free PMMA macromonomers bearing a vinyl group at the ω-terminus may have the following molecular structural formula:

A

B

C

D

In step (3), the in-situ adjustment of the structure of the encapsulated polymer layer can be achieved by sequentially dropping the acrylate monomers for RAFT polymerization. An acrylate monomer undergoing oxygen-exhausting treatment in advance and a water-soluble initiator aqueous solution may be added by injection at a feed rate of 0.02 mL/min to 10 mL/min, where the initiator aqueous solution may be added at a volume equal to a volume of the monomer.

In step (3), the acrylate monomer may include a hard monomer and a soft monomer; the hard monomer may be MMA, i-butyl methacrylate (i-BMA), or benzyl methacrylate (BzMA); and the soft monomer may be butyl methacrylate (BMA) or BA.

In step (3), the acrylate monomers may be sequentially added dropwise to synthesize a polymer-encapsulated organic pigment with a controllable structure, and an obtained polymer/organic pigment hybrid latex may have a polydispersity index (PDI) of about 1 to 2.

In step (3), a mass ratio of the acrylate hard monomer to the acrylate soft monomer may be 1:9 to 9:1.

In the present disclosure, a polymer/organic pigment hybrid latex is synthesized by sulfur-free and soap-free in-situ RAFT emulsion copolymerization. Three reactive emulsifiers are used to disperse a pigment to prepare pigment dispersions; then an RAFT agent of amphiphilic sulfur-free PMMA macromonomers bearing a vinyl group at the ω-terminus is synthesized by the CCTP method; and an acrylate monomer is added dropwise, in-situ sulfur-free RAFT polymerization is allowed through the RAFT agent of amphiphilic sulfur-free PMMA macromonomers bearing a vinyl group at the ω-terminus, and the structure and composition of an encapsulated polymer layer are adjusted to obtain a series of polymer/organic pigment hybrid latexes with uniform encapsulation and stable dispersion.

Compared with the prior art, the present disclosure has the following beneficial effects:
1. In the present disclosure, with water as a medium, an RAFT agent of amphiphilic sulfur-free PMMA macromonomers bearing a vinyl group at the ω-terminus is designed and synthesized through sulfur-free and soap-free in-situ RAFT emulsion copolymerization, and then configured for the encapsulation of organic pigment particles.
2. The sulfur-free RAFT free radical emulsion polymerization used in this research involves mild reaction conditions and leads to a colorless and odorless polymer, which is expected to realize the preparation of a sulfur-free and soap-free polymer/pigment hybrid latex.
3. Compared with other polymer/organic pigment hybrid latexes, a polymer/organic pigment hybrid latex synthesized by the sulfur-free and soap-free in-situ RAFT emulsion copolymerization gets rid of defects in existing hybrid latexes such as poor dispersion stability and uncontrollable molecular structure of an encapsulated polymer layer.
4. The hybrid latex prepared through sulfur-free and soap-free in-situ RAFT emulsion copolymerization in the present disclosure has the characteristics of high dispersion stability, high pigment encapsulation efficiency, clear and controllable encapsulated polymer layer structure, etc., which is suitable for surface encapsulation modification of various pigments.

BRIEF DESCRIPTION OF THE DRAWINGS

FIG. 3A and FIG. 3B show transmission electron microscopy (TEM) images of an unmodified pigment and a prepared polymer/organic pigment hybrid latex, where FIG. 3A is a TEM image of the unmodified pigment and FIG. 3B is a TEM image of the polymer/organic pigment hybrid latex prepared in Example 9 in Table 2.

DETAILED DESCRIPTION OF THE EMBODIMENTS

The above are only preferred examples of the present disclosure and are not intended to limit the present disclosure. Although the present disclosure is described in detail with reference to the foregoing examples, a person skilled in the art can still make modifications to the technical solutions described in the foregoing examples, or make equivalent replacement to some technical features. Any modifications, equivalent substitutions, improvements, etc. made within the spirit and scope of the present disclosure should be included within the protection scope of the present disclosure.

EXAMPLES

According to the feeding ratios and conditions shown in Tables 1 and 2, a polymer/organic pigment hybrid latex was prepared, including the following steps:
1. A reactive emulsifier was dissolved in water, a pigment was added, and a resulting mixture was subjected to ultrasonic homogenization to obtain a pigment dispersion. The reactive emulsifier was used at an amount 5% to 10% of an amount of a monomer.
2. The CCTP method was used to synthesize an RAFT agent of amphiphilic sulfur-free PMMA macromonomers bearing a vinyl group at the ω-terminus in-situ on a surface of pigment particles. Specific experimental steps were as follows: a catalytic chain transfer agent and a methacrylate monomer were added to a 100 mL round-bottom flask with a stir bar, and nitrogen was purged for at least 1 h, such that the mixture was stirred in a nitrogen atmosphere until the solid was completely dissolved; at the same time, the pigment dispersion, an initiator (ACVA, which had a mass 2.5% of a mass of methacrylate monomer), and deionized water were added to a four-necked flask equipped with a mechanical stirrer, a reflux condenser, and a nitrogen inlet, and a resulting mixture was introduced with nitrogen and stirred at 300 rpm for at least 30 min; then a mixed solution of the methacrylate monomer and the catalyst (the feed rate is 0.6 mL/min) that had undergone oxygen-exhausting treatment in advance was injected into the four-necked flask to allow polymerization in a 70° C. constant-temperature water bath at a stirring speed of 300 rpm; and after the injection was completed, a resulting mixture was further stirred for 2 h to 3 h at the same temperature.
3. In-situ sulfur-free RAFT polymerization was allowed through the RAFT agent of amphiphilic sulfur-free PMMA macromonomers bearing a vinyl group at the ω-terminus, and a structure and a composition of an encapsulated polymer layer were adjusted to obtain a series of polymer/organic pigment hybrid latexes with uniform encapsulation and stable dispersion. Specific experimental steps were as follows: the RAFT agent of amphiphilic sulfur-free PMMA macromonomers bearing a vinyl group at the ω-terminus was diluted with an appropriate amount of water to achieve a solid content of 20 wt %; a resulting latex was added to a four-necked flask and purged with nitrogen for 30 min under stirring at 250 rpm; then an acrylate monomer that had undergone oxygen-exhausting treatment in advance and an initiator aqueous solution were injected into the four-necked flask at an injection rate of 0.3 mL/min, where for each addition, a volume of the initiator aqueous solution was equal to a volume of the monomer; and after the addition was completed, the reaction was further conducted for 2 h to 3 h under the same conditions; where during the polymerization process, a nitrogen environment was maintained and a polymerization temperature was maintained at 80° C.

Comparative Example 1

An emulsifier SDS was dissolved in water, phthalocyanine blue and a methacrylate monomer were added, and a resulting mixture was subjected to ultrasonic homogenization to obtain a pigment dispersion; water (as a solvent) and a water-soluble initiator were added to the pigment dispersion, and a resulting mixture was introduced with nitrogen for 0.5 h under stirring, and then heated in an inert atmosphere to allow a reaction for 2 h to 3 h; and then an acrylate monomer that had undergone oxygen-exhausting treatment in advance and an initiator aqueous solution were directly added to allow polymerization to obtain a polymer/organic pigment hybrid latex.

TABLE 1

| Example | Pigment type | Emulsifier | Methacrylate monomer/g | Emulsifier/monomer (%) | Molecular weight (Mn) |
|---|---|---|---|---|---|
| Comparative Example 1 | Phthalocyanine blue | SDS | MMA/10 g | 9 | 1665 |
| Examples 1 to 6 | Phthalocyanine blue | HPMAS | MMA/10 g | 3 | 1923 |
|  |  |  |  | 9 | 1800 |
|  |  |  |  | 12 | 2034 |
|  |  |  | BMA/10 g | 3 | 1986 |
|  |  |  |  | 9 | 1834 |
|  |  |  |  | 12 | 2154 |
| Examples 7 to 12 |  | DNS-86 | MMA/10 g | 3 | 2876 |
|  |  |  |  | 9 | 2453 |
|  |  |  |  | 12 | 3167 |
|  |  |  | BMA/10 g | 3 | 2908 |
|  |  |  |  | 9 | 2534 |
|  |  |  |  | 12 | 3245 |

According to the feeding ratios and conditions shown in Table 1, an RAFT agent of amphiphilic sulfur-free PMMA macromonomers bearing a vinyl group at the ω-terminus was synthesized in-situ on a surface of pigment particles through CCTP. Different emulsifiers and different methacrylate monomers could be added to obtain RAFT agents of amphiphilic sulfur-free PMMA macromonomers bearing a vinyl group at the ω-terminus with different structures. With Examples 2, 5, 8, and 11 as examples, the RAFT agent of amphiphilic sulfur-free PMMA macromonomers bearing a vinyl group at the ω-terminus had the following molecular structural formula:

A

B

C

D

Figure 4:
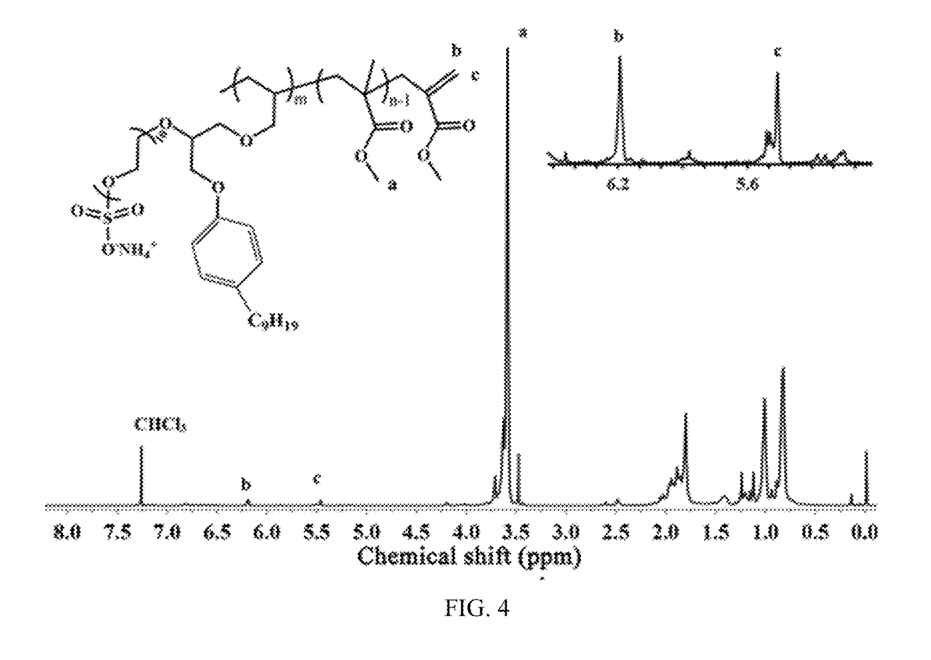
FIG. 4 shows a $^1$HNMR spectrum of the RAFT agent of amphiphilic sulfur-free PMMA macromonomers bearing a vinyl group at the ω-terminus synthesized in Example 8.

FIG. 4 shows a $^1$HNMR spectrum of the RAFT agent of amphiphilic sulfur-free PMMA macromonomers bearing a vinyl group at the ω-terminus synthesized in Example 8. The $^1$HNMR spectrum confirmed the presence of the ω-terminal unsaturated group in the macromolecular RAFT agent (macromonomer vinyl peaks appeared at 6.20 ppm and 5.47 ppm), indicating the success of CCTP, namely, the successful synthesis of the RAFT agent of amphiphilic sulfur-free PMMA macromonomers bearing a vinyl group at the ω-terminus. It can be seen from Examples 1 to 12 that, when a mass of the emulsifier accounts for 9% of a mass of the monomer, the macromolecular RAFT reagent has the smallest molecular weight and also has a high terminal ω-vinyl content, which is beneficial to the subsequent sulfur-free RAFT polymerization adjustment test. Therefore, an emulsifier-monomer ratio of 9% was adopted in the subsequent examples.

TABLE 2

| Example | Pigment type | Emulsifier | Methacrylate monomer | Acrylate monomer | Ratio of acrylate soft monomer to acrylate hard monomer |
|---|---|---|---|---|---|
| Comparative Example 1 | Phthalocyanine blue | SDS | MMA | BMA/BzMA | 1:9 |
| Examples 1 to 8 | Phthalocyanine blue | HPMAS | MMA | BMA/BzMA | 1:9 |
| | | | | BMA/BzMA | 1:5 |
| | | | | BMA/BzMA | 5:1 |
| | | | | BMA/BzMA | 9:1 |
| | | | BMA | BA/BzMA | 1:9 |
| | | | | BA/BzMA | 1:5 |
| | | | | BA/BzMA | 5:1 |
| | | | | BA/BzMA | 9:1 |
| Examples 9 to 12 | | DNS-86 | MMA | BMA/BzMA | 1:5 |
| | | | | BMA/BzMA | 5:1 |
| | | | BMA | BA/BzMA | 1:5 |
| | | | | BA/BzMA | 5:1 |
| Examples 13 to 16 | Titanium dioxide | DNS-86 | MMA | BMA/BzMA | 1:5 |
| | | | | BMA/BzMA | 5:1 |
| | | | BMA | BA/BzMA | 1:5 |
| | | | | BA/BzMA | 5:1 |
| Examples 17 to 20 | Benzidine yellow | DNS-86 | MMA | BMA/BzMA | 1:5 |
| | | | | BMA/BzMA | 5:1 |
| | | | BMA | BA/BzMA | 1:5 |
| | | | | BA/BzMA | 5:1 |

The obtained polymer/organic pigment hybrid latexes were used as ink for ink-jet printing of cotton fabrics, obtained printed fabrics were tested for the rubbing fastness, hand feel, air permeability, and other properties, and results were shown in Table 3.

Determination methods for the data were as follows:

1. A particle size of the polymer/organic pigment hybrid latex was determined by a nano-laser particle size analyzer (Nano-90 nano-laser particle size analyzer (Malvern Panalytical, UK), and an average particle size was calculated for the hybrid latex.

2. The dry and wet rubbing fastness test was conducted with reference to GB/T3920-2008 "Color Fastness to Rubbing, Textile Color Fastness Test", where two samples were used in each of the warp and weft directions, with a size of 50 mm×200 mm; and a standard rubbing cotton cloth was used, with a size of 50 mm×50 mm.

3. Hand feel test: Finished fabrics were touched with eyes closed (with one person in each group), and the printed fabrics were evaluated according to different hand feels. Specifically, hand feel grading was conducted from the two aspects of softness and smoothness, and a total of 5 grades were classified. Grade 1 indicates the worst hand feel, in which case a fabric feels hard and unsmooth; and grade 5 indicates the best hand feel, in which case the fabric feels soft and smooth.

TABLE 3

| Example | Average particle size of emulsion (nm) | Dry rubbing fastness/grade | Wet rubbing fastness/grade | Hand feel/ grade |
|---|---|---|---|---|
| Comparative Example | 293 | 3 | 2-3 | 3 |
| Example 1 | 235 | 4-5 | 4 | 4 |
| Example 2 | 228 | 4 | 4 | 4 |
| Example 3 | 239 | 4-5 | 4-5 | 5 |
| Example 4 | 225 | 4 | 4 | 5 |
| Example 5 | 238 | 4 | 4 | 4 |
| Example 6 | 235 | 4 | 4 | 4 |
| Example 7 | 237 | 4 | 4 | 5 |
| Example 8 | 244 | 4-5 | 4-5 | 5 |
| Example 9 | 240 | 4-5 | 4 | 4 |
| Example 10 | 252 | 4-5 | 4 | 5 |
| Example 11 | 248 | 4-5 | 4 | 4 |
| Example 12 | 256 | 5 | 4-5 | 5 |
| Example 13 | 282 | 4 | 4 | 4 |
| Example 14 | 293 | 5 | 4-5 | 5 |
| Example 15 | 288 | 4 | 4 | 4 |
| Example 16 | 296 | 4 | 4 | 5 |
| Example 17 | 267 | 4-5 | 4 | 4 |
| Example 18 | 258 | 5 | 4-5 | 5 |
| Example 19 | 254 | 5 | 4 | 4 |
| Example 20 | 261 | 4-5 | 4 | 5 |

Figure 1:
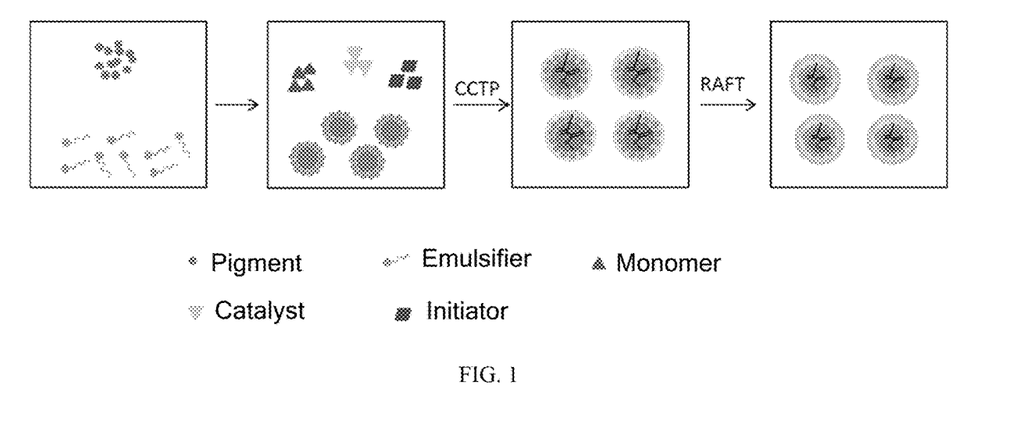
FIG. 1 is a schematic diagram of the process for synthesizing a polymer/organic pigment hybrid latex through sulfur-free and soap-free in-situ RAFT emulsion copolymerization. (CCTP represents catalytic chain transfer polymerization and RAFT represents reversible addition-fragmentation chain transfer polymerization)
Figure 2:
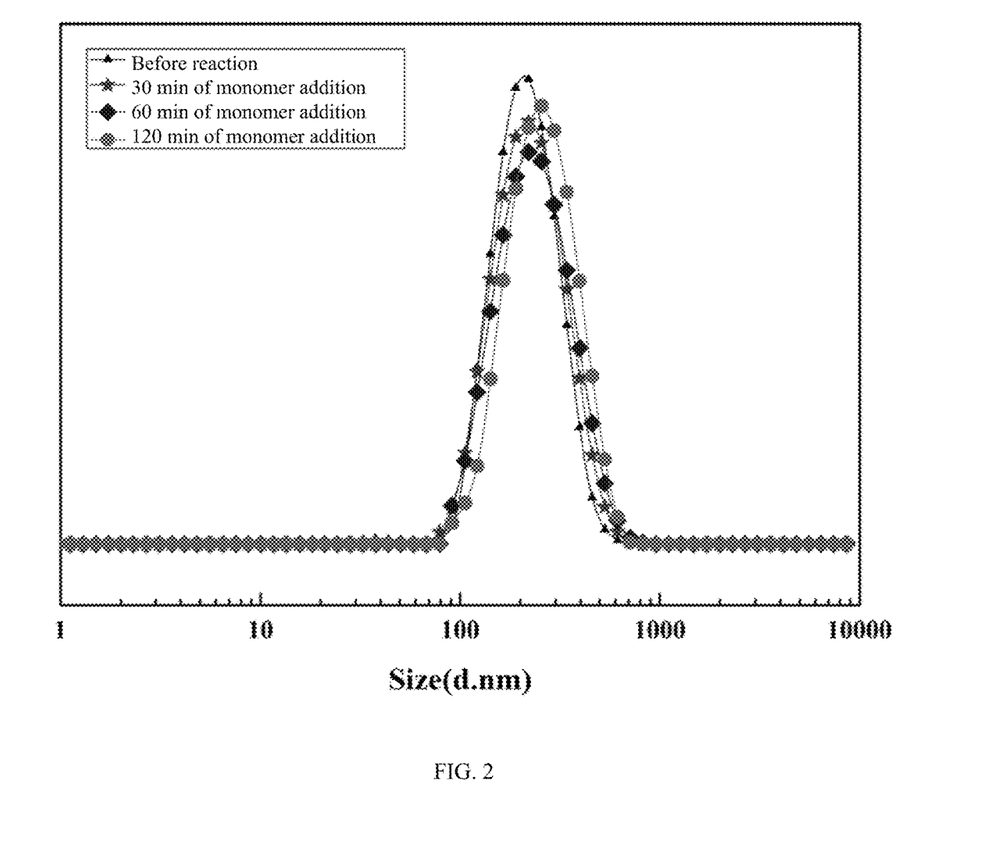
FIG. 2 shows an emulsion particle size growth process in the sulfur-free and soap-free in-situ RAFT emulsion copolymerization process of Example 9 in Table 2. (size represents a particle size)
Figure 3A:
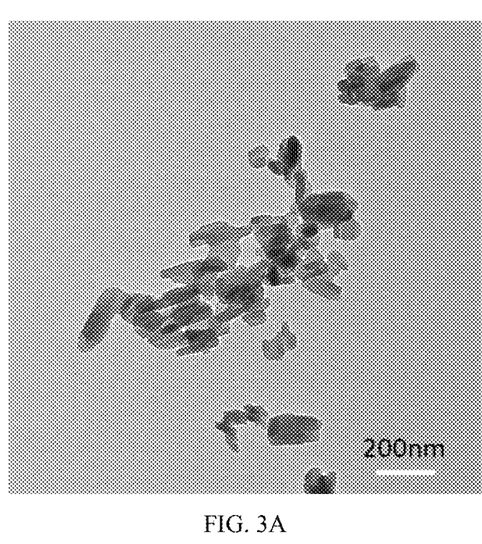
Figure 3B:
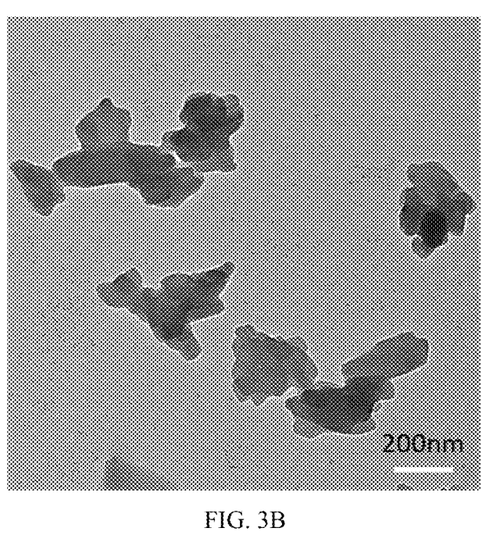

FIG. 1 is a schematic diagram of the process for synthesizing a polymer/organic pigment hybrid latex through sulfur-free and soap-free in-situ RAFT emulsion copolymerization in the above examples. The growth of emulsion particle size during the sulfur-free and soap-free in-situ RAFT emulsion copolymerization process in Example 9 was tracked, and the particle size growth was shown in FIG. 2. It can be seen that, with the gradual addition of the monomer, the emulsion particle size continuously increased, which indirectly proved that a shell was formed on a surface of the pigment during the polymerization process. The polymer encapsulation was further verified by TEME. FIG. 3A and FIG. 3B are TEM images of the original phthalocyanine blue and the polymer/organic pigment hybrid latex, respectively. It can be seen from the TEM images that the surface of the polymer/organic pigment hybrid latex prepared through sulfur-free and soap-free in-situ RAFT emulsion polymerization was covered with a thick shell.

It can be seen from Table 3 that the use of the polymer/organic pigment hybrid latex synthesized through sulfur-free and soap-free in-situ RAFT emulsion copolymerization in the present disclosure can effectively improve the existing pigment printing technology, such that printed fabrics obtained thereby have a fastness of 4 to 5 to dry and wet rubbing and feel soft. The hybrid latex has a particle size of 200 nm to 300 nm, so when the hybrid latex is used as an ink for ink-jet printing, the nozzle clogging can be reduced.

What is claimed is:

1. A method for synthesizing a polymer/pigment hybrid latex through a sulfur-free and soap-free in-situ reversible addition-fragmentation chain transfer (RAFT) emulsion copolymerization, comprising the following steps:
   (1) dispersing a pigment with a reactive agent to prepare a pigment dispersion;
   (2) adding a methacrylate comonomer, a cobalt complex as a catalyst, water as a solvent, and a water-soluble initiator to the pigment dispersion to form a first reaction system, and allowing the reaction system to undergo a catalytic chain transfer polymerization (CCTP) to obtain a second reaction system, wherein an RAFT agent is synthesized in-situ on surfaces of pigment particles in the second reaction system;
   (3) adding an acrylate monomer to the second reaction system with the RAFT agent obtained in step (2), allowing a in-situ sulfur-free RAFT polymerization through the RAFT agent, and adjusting a structure and a composition of an encapsulated polymer layer to obtain a series of uniformly encapsulated and stably dispersed polymer/organic pigment hybrid latexes.

2. The method for synthesizing the polymer/pigment hybrid latex through the sulfur-free and soap-free in-situ RAFT emulsion copolymerization according to claim 1, wherein in step (1), the reactive agent is allyloxy polyoxyethylene nonyl ammonium sulfate and the reactive agent is added at an amount 5% to 10% of a mass of the methacrylate comonomer.

3. The method for synthesizing the polymer/pigment hybrid latex through the sulfur-free and soap-free in-situ RAFT emulsion copolymerization according to claim 1, wherein in step (1), the pigment comprises phthalocyanine blue or benzidine yellow.

4. The method for synthesizing the polymer/pigment hybrid latex through the sulfur-free and soap-free in-situ RAFT emulsion copolymerization according to claim 1, wherein in step (2), the cobalt complex is bis[(difluoroboryl) dimethylglyoximato] cobalt (II); and the cobalt complex is added at an amount 80 ppm to 120 ppm of a mass of the methacrylate comonomer.

5. The method for synthesizing the polymer/pigment hybrid latex through the sulfur-free and soap-free in-situ RAFT emulsion copolymerization according to claim 1, wherein in step (2), the methacrylate comonomer is one or two selected from the group consisting of methyl methacrylate (MMA) and n-butyl methacrylate (n-BMA).

6. The method for synthesizing the polymer/pigment hybrid latex through the sulfur-free and soap-free in-situ RAFT emulsion copolymerization according to claim 1, wherein in step (2), the water-soluble initiator is one or more selected from the group consisting of azodicyanovaleric acid (ACVA), potassium persulfate (KPS), and ammonium persulfate (APS);

and the water-soluble initiator is added at an amount 1% to 5% of a mass of the methacrylate comonomer.

7. The method for synthesizing the polymer/pigment hybrid latex through the sulfur-free and soap-free in-situ RAFT emulsion copolymerization according to claim 1, wherein in step (2), the cobalt complex is dissolved in the methacrylate comonomer, and then a resulting mixture is added to the first reaction system by an injection.

8. The method for synthesizing the polymer/pigment hybrid latex through the sulfur-free and soap-free in-situ RAFT emulsion copolymerization according to claim 1, wherein in step (3), the acrylate monomer is a combination of a hard monomer and a soft monomer; the hard monomer is MMA, i-butyl methacrylate (i-BMA), or benzyl methacrylate (BzMA); and the soft monomer is butyl methacrylate (BMA) or butyl acrylate (BA).

9. The method for synthesizing the polymer/pigment hybrid latex through the sulfur-free and soap-free in-situ RAFT emulsion copolymerization according to claim 8, wherein in step (3), a mass ratio of the hard monomer to the soft monomer is 1:9 to 9:1.

* * * * *